United States Patent Office 3,444,574
Patented May 20, 1969

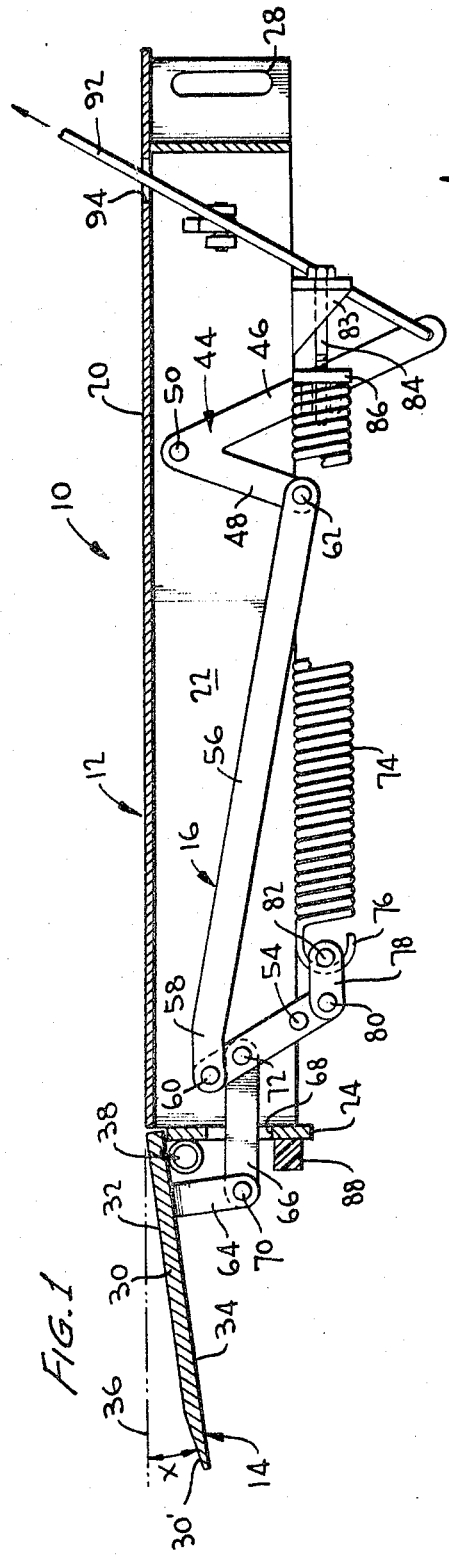
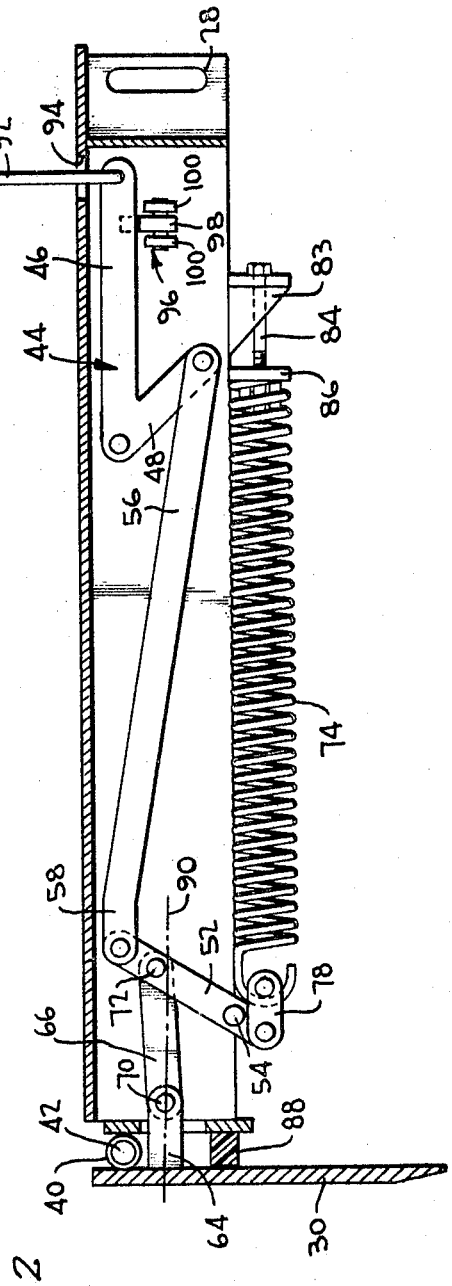
INVENTOR,
ROBERT L. LeCLEAR
BY Jacobi & Davidson
ATTORNEYS

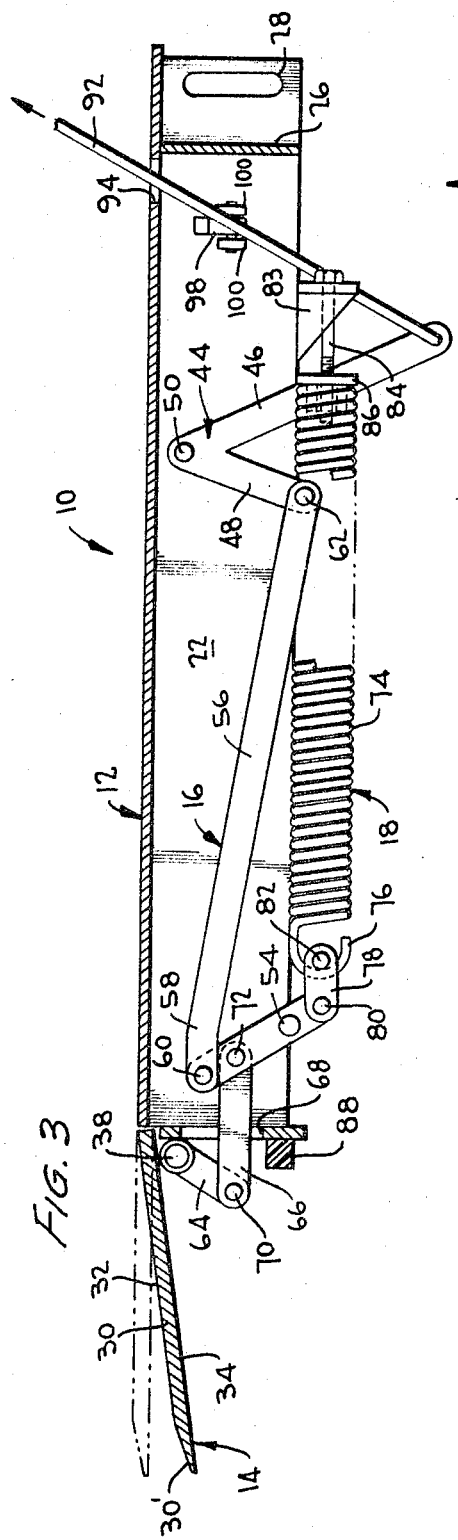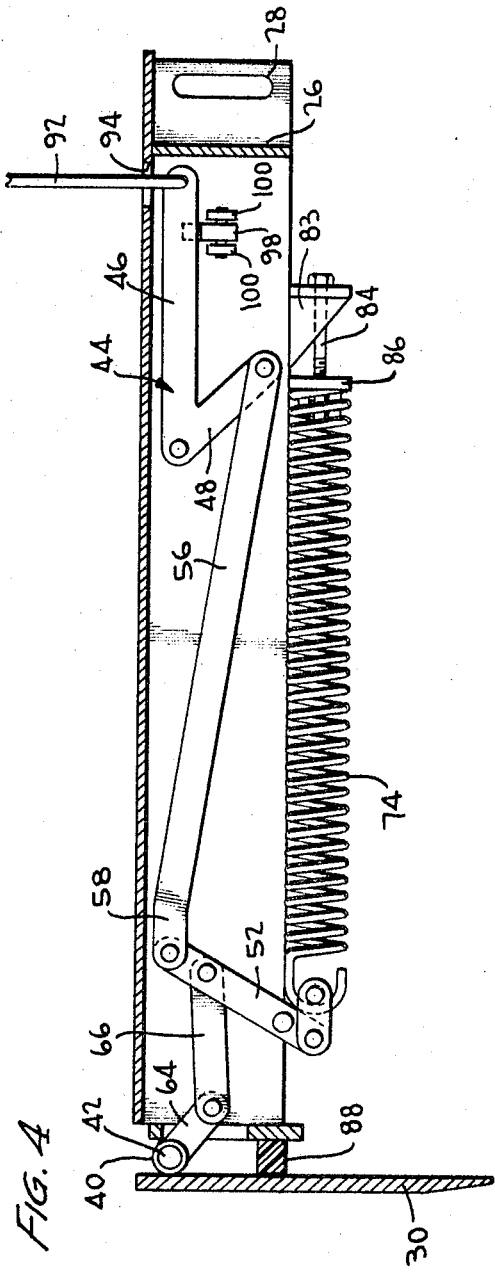

3,444,574
DOCKBOARD CONSTRUCTION
Robert L. Le Clear, Albion, Mich., assignor to F&S Equipment Co., Albion, Mich., a corporation of Michigan
Continuation-in-part of application Ser. No. 576,039, Aug. 30, 1966. This application Oct. 6, 1966, Ser. No. 598,547
Int. Cl. B65g 11/00
U.S. Cl. 14—71    9 Claims

ABSTRACT OF THE DISCLOSURE

A dockboard having a relatively movable lip member affixed thereto is disclosed. Linkage means couples the lip member with the main platform of the dockboard and coacts with biasing means to position the lip member such that engagement of a truck bed with the same will move it in the proper direction to position it for use.

---

This application is a continuation-in-part of my copending application Ser. No. 576,039, filed Aug. 30, 1966 and now abandoned.

This invention relates to material handling equipment and more particularly it relates to a dock leveler device or dockboard having a relatively movable lip member affixed thereto.

Dockboards of the type to which this subject invention is addressed have become relatively popular in recent years, and have been widely adopted and used by companies having large shipping docks or platforms. In the usual instance, each dockboard consists of a main ramp or platform swingably mounted over an open pit, with the rear of the dockboard being hinged at the rear end of the pit. Suitable actuating means in the form of hydraulic cylinder and piston means, powerful springs, electric drive motors, or other suitable expedients, coact between the underside of the platform and the pit to enable the platform to be raised and lowered. A lip member is customarily provided at the forward end of the ramp or platform so that when a truck backs into the dockboard for loading or unloading, the lip at the forward end of the platform rests upon the bed of the truck.

On all of the prior art forms of dockboards, the lip member at the forward end thereof has been one of two types, namely, either a fixed lip or a movable lip. A "fixed" lip was of the type that was either immovably affixed to or integral with the ramp to act as a continuing forward extension thereof. Problems were experienced with this type of lip member, particularly if a high bed truck backed up to the dockboard in a careless manner. Under such circumstances, the rear end of the truck would contact the forward end of the lip and would then bend, break or otherwise mutilate the same.

As for the movable type of lip member, it has been customary to hinge the rear end of the lip member to the forward end of the ramp or platform so that the lip member is swingable with respect to the ramp. An alternative form of movable lip member has been one which moves in a generally parallel relationship with respect to the ramp to either slide under or over the same when retracted. These movable forms of lip members have proved to be highly desirable and commercially acceptable because the same could be moved to a retracted position when the dockboard was not in use. However, the drawbacks and deficiencies associated with all prior forms of movable lip members resided in the fact that special actuating means had to be utilized to move the lip member from its retracted position to its operative position. In some instances, camming means was utilized, in other instances hydraulic cylinder and piston means was utilized, and in still other instances, actuating cable means was utilized. Still, regardless of what form of actuating means was utilized, it was generally a somewhat complicated and expensive type of arrangement which materially increased the initial cost of the dockboard unit, as well as the maintenance and upkeep thereof.

With the foregoing matter in mind, it, is, therefore, a primary object of the present invention to overcome the difficulties and deficiencies associated with prior art forms of dockboard devices, and particularly, with the lip members thereupon, and to provide in their stead a new and improved dockboard construction.

Another object of the present invention is to provide a dockboard unit incorporating a lip member having the advantageous features of both a fixed type lip and a movable type lip, without encountering the disadvantages and shortcomings of either of these types of lips.

Another object of the present invention is to provide a dockboard unit having a lip member of the movable type, which lip member needs no special actuating mechanism to place the same in operative condition, but which will not be damaged should a truck inadvertently back into the same.

Another object of the present invention is to provide a dockboard unit having a lip member of the movable type, and special actuating mechanism for operating the lip but wherein neither the lip member nor the special actuating mechanism will be damaged should a truck inadvertently back into the same.

Another object of the present invention is to provide a dockboard which is relatively inexpensive to produce, yet which is highly durable in construction and will operate simply and efficiently under varying types of operating conditions.

Other objects, advantages and salient features of the present invention will become apparent from the following detailed description, which, taken in conjunction with the annexed drawings, discloses a preferred embodiment thereof.

Referring to the drawings:

FIGURE 1 is a sectional view through a dockboard unit in accordance with the principles of the present invention, the lip member thereof being in its normal position;

FIGURE 2 is a sectional view, similar to FIGURE 1, but with the lip member being in pendent position;

FIGURE 3 is a sectional view through a dockboard with a modified form of lip member, the lip member being shown in normal position;

FIGURE 4 is a sectional view, similar to FIGURE 3, but with the modified lip member being shown in pendent position;

Figure 5:
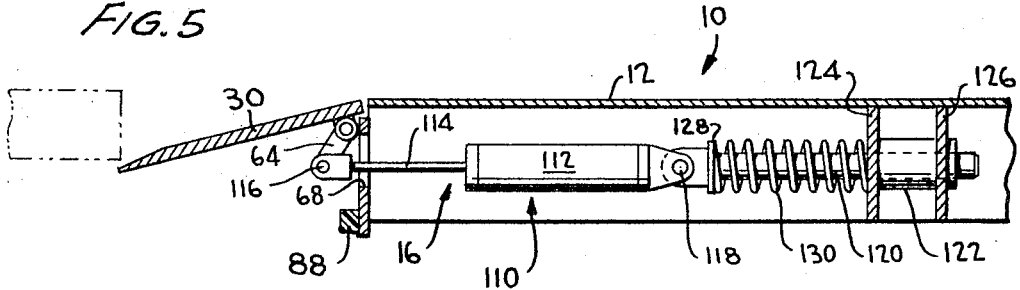
FIGURE 5 is a sectional view through a dockboard with the modified lip member of FIGURE 3, but with an actuating cylinder used to raise the lip member to normal position.

With continued reference to the drawings, there is shown in FIGURE 1 thereof a dockboard unit in accordance with the principles of the present invention, such unit being generally designated 10. The unit 10 includes a main ramp or platform generally designated 12, a lip member generally designated 14, linkage means generally designated 16 and a biasing means generally designated 18.

The main platform 12 includes a substantially planar top surface 20 mounted between a pair of opposed side supporting beams 22. At the forward end of the main platform 12, a forward face member 24 extends between the side beams 22, and adjacent the rear end of the main platform 12, a similar rear face member 26 extends between the side beams. Slots 28 are provided in the side beams adjacent the rear end of the main platform to enable the same to be suitably mounted by means of a hinge plate or other suitable expedient so that the main platform 12 is swingably mounted over a pit. Any form of suitable actuating means can be utilized to coact between the main platform 12 and the pit for raising and lowering the dockboard, as is conventional in all units of this type.

The lip member 14 is customarily formed as a rigid sheet 30, or plate, having an upper surface 32 and a lower surface 34 disposed in substantially parallel relationship with each other. The thickness of the plate 30 is substantially equal to the distance from the top of the front plate 24 to the top surface 20 on the main platform 12, whereby, when the lip member 14 is raised to its fully extended position, the top surface 32 thereof forms a virtually continuous and coextensive, coplanar extension of the top surface 20 of the main ramp. In other words, in fully elevated position, the top surface 32 of the lip member is aligned with the imaginary axis 36 in FIGURE 1, such axis forming a continuing coplanar extension of the top surface 20 of the main ramp.

Hinge means generally designated 38 is utilized to interconnect the lip member 14 with the main platform 12. Such hinge means 38 includes a plurality of alternating knuckles 40, some of which are fixed to the lower surface 34 of the lip member 14, and alternating ones of which are affixed to the forward surface of the front face 24 on the main platform. When properly assembled, the lip member knuckles are aligned with the ramp member knuckles and a hinge pin or rod means 42 extends therethrough. This hinge pin or rod means 42 serves to define the axis of the hinge means 38 and the same extends transversely of the dockboard unit 10 in substantially parallel relationship with the plane of the top surface 20.

Considering now the linkage means 16, it will be seen that the same includes an operating crank generally designated 44 and including a long arm 46 and a shorter arm 48. At the juncture where the arms 46 and 48 intersect one another, a fulcrum pin 50 serves to mount the operating lever 44 for swingable or pivotal movement thereabout. A lever 52 is likewise coupled with the main platform 12 forwardly of the operating crank 44, with such member being mounted by means of a fulcrum pin 54 between the ends of the lever 52. An elongated link 56 extends between the operating crank 44 and the lever 52, such link including a slightly angled or offset portion 58 at one end thereof. The offset portion 58 is pivotally connected with the uppermost end of the lever 52, as by a pivot pin 60, while the opposite end of the link 56 is connected with the end of the shorter crank arm 48 as by means of a pivot pin 62.

In the embodiment of FIGURES 1 and 2, a leg means 64 depends substantially perpendicularly from the lower surface 34 of the lip member 14, with such leg means 64 being disposed slightly in advance of the hinge knuckles 40. A further link 66 is utilized to interconnect the leg means 64 with the lever 52, and to this end, an opening 68 is provided in the front face 24 of the main platform. The link 66 extends through the opening 68 and has its forward end thereof attached to the end of the leg means 64 by means of a pivot pin 70. The opposite end of the link 66 is pivotally connected to the lever 52 by means of a pivot pin 72, with the location of the pivot pin 72 being somewhat between the fulcrum 54 and the hinge pin 60. Hence, movement of the lever 52 about its fulcrum 54 will be transmitted to the link 66 and, in turn, to the lip member 14.

As aforementioned, the invention also includes a biasing means 18, and such biasing means is suitably coupled with the linkage means 16. The major element of the biasing means 18 is an elongated tension spring 74 having a hook 76 at the forward end thereof. Means for coupling this spring hook 76 with the lever 52 include a pair of spaced apart ears 78 connected at one end by a pivot pin 80 to the lower end of the lever 52 and connected at their opposite end by a fixed pin 82 against which the spring hook 76 engages.

A mount 83 is affixed to the main platform 12 to form a part of the biasing means 18 and an adjusting screw 84 threads through this mount 83 for positioning of the stop or abutment plate 86. The end of the spring means 74 opposite the hook 76 is fixed to this abutment plate 86 so that proper adjustment of the screw 84 can suitably vary the position of the plate 86 and can hence adjust the tension of the spring 74.

To understand the operative characteristics of the mechanism described thus far, it must be appreciated that the lip member 14 has two extreme positions which are displaced from one another by essentially 90°. The first of these positions can be considered as the operative position, whereat the upper surface 32 of the lip member is substantially coplanar with the top surface 20 of the main platform. In this position, the lip 14 forms a continuous extension of the main platform 12 and the angle between the imaginary axis 36 of FIGURE 1 and the top surface 32 is essentially zero. The other extreme position of the lip member 14 is the downward or pendent position shown in FIGURE 2 whereat the lower surface 34 of the lip member contacts against a resilient bumper means 88 affixed to the front face 24 of the main platform. In this pendent position, the lip member 14 is disposed substantially perpendicularly to the top surface 20 of the main platform 12. While not essential, it is preferred that the top surface 30 of the lip member 14 taper somewhat at the forward end thereof, as indicated at 30' to thereby provide a smooth transition for wheeling articles onto or off of the dockboard unit 10.

It will, however, be seen that the normal position of the lip member 14, as the same is shown in FIGURE 1, is not at either of the extreme positions of the lip. Instead, the normal position of the lip member 14 is disposed at some small angle $x$ to the plane of the top surface 20. In any event, the angle $x$ should not exceed 45°, but it is preferred that the same is considerably less than that, somewhere in the neighborhood of 20°. As such, when a truck backs up to the dockboard unit 10, its bed might be above or below the level of the forward end of the lip member 14 while the same is retained in its normal position. If the level of the truck bed is below the level of the lip member, then the main platform 12 can be lowered until at least the forward portion of the lower lip surface 34 engages with the bed of the truck, whereupon further lowering of the main platform will cause the lip member 14 to move from its normal position of FIGURE 1 to its extreme upper or operative position. That is, the angle $x$ will be reduced to zero and the upper surface 30 of the lip member will be substantially coplanar with the top surface 20 of the main platform.

If, on the other hand, a truck should inadvertently back up to the dockboard, with the level of the truck bed being higher than the level of the forward end of the lip member, then the rear end of the truck will engage the upper surface of the lip, generally along the tapered portion 30' thereof. When this occurs, the lip member will be folded downwardly from its normal position of FIGURE 1 toward its pendent position as shown in FIGURE 2. Usually, even if a truck inadvertently contacts the lip member, it will not push the same all the way to its pendent position, but only partially toward such position. In any event, if the truck finally stops with the lip member 14 being folded to some position between its normal position of FIGURE 1 and its pendent position of FIGURE 2, then operation of the actuating mechanism for the main platform 12 can be utilized to raise such main platform until the end of the lip member 14 swings clear of the back of the truck. At such time, the lip member will automatically return to its normal position of FIGURE 1.

To understand why the lip member 14 is maintained in the normal position shown in FIGURE 1, it will be appreciated that the biasing spring 74 is, at such position, in its fully collapsed position. In such position, as can be adjusted through the use of adjusting screws 84, the lever 52 is swung about its fulcrum 54 to adjust the size of the angle $x$. If it is desired to increase or decrease the size of this angle, such a change can be made merely by the simple expedient of adjustment of the screw 84 which, in turn, varies the tension of the spring 74.

It is important to note that even when the lip member 14 is in its fully pendent position, as shown in FIGURE 2, the link 66 and the leg means 64 have not yet reached a dead center position. That is, the pivot pins 70 and 72 are not coaxially aligned with one another along an axis extending through the link and the leg means. Such an axis would form the dead center axis, and the same is shown in FIGURE 2 as an imaginary axis designated 90. If, in fact, the leg means 64 and the link 66 were aligned along this dead center axis 90, then the unit would lock in its pendent position, and the same could not automatically return to its normal position of FIGURE 1. However, due to the fact that the central axis of the link means 66 is displaced slightly from the dead center axis 90, the linkage means 16 will automatically return the lip member 14 to its normal position, in the absence of some restraining force thereupon. This return of the lip member to its normal position is accomplished by the spring 74 elastically recovering from its extended position of FIGURE 2 back to its normal or collapsed position of FIGURE 1. As the spring 74 compresses in this manner, it swings the lever 52 about its fulcrum 54 thereby pushing the link 66 forwardly through the opening 68 and thereby pivoting the lip member 14 about the axis of the hinge means 38.

In certain instances, it may be desirable to provide means whereby the lip member 14 can be manually moved to the pendent position of FIGURE 2, and to this end, a flexible cable 92 is coupled to the end of the longer arm 46 on the operating crank 44. This cable 92 extends through a small opening 94 in the top surface 20 of the main platform, and suitable hand grip means can be provided at the outboard end of the cable 92. Hence, if an operator desires to collapse the lip member 14 from its normal position of FIGURE 1 to its pendent position of FIGURE 2, he need merely exert a manual pulling force along the flexible cable 92, which, in turn, will pivot the operating crank 44 about its fulcrum 50. Such pivoting can continue until the lip member 14 reaches its fully pendent position of FIGURE 2 whereat the lower surface 34 thereof engages with the resilient bumper 88. If, for some reason, it is desired to maintain the lip member 14 in this pendent position, even after manual force on the flexible cable 92 is released, then a suitable lock means generally designated 96 may be utilized. This lock means 96 includes a pivotable locking member 98 mounted between a pair of spaced ears 100, 100. Normally, the locking member 98 is pivoted out of operative position and will not engage with the arm 46 of the operating crank 44. However, when it is desired to lock the lip member 14 in its pendent position of FIGURE 2, then the locking member 98 can be swung to its operative position whereat it blocks or locks the crank member 44 in its position shown in FIGURE 2, by extending beneath the elongated arm 46.

Referring now to a modified embodiment of the invention, as shown in FIGURES 3 and 4, it will be seen that all mechanism shown therein is the same as that previously described with the exception of the positioning of the leg means 64. Instead, in the embodiment of FIGURES 3 and 4, the leg means 64 does not extend substantially perpendicularly from the lip lower surface 34, but rather subtends an acute angle therebetween. Also, it will be seen that the upper end of the leg means 64 actually forms a part of the hinge means 38 so that the hinge axis extends perpendicularly through the leg means 64. As a result, it will be appreciated that with such embodiment, the angle between the central axis of the leg means 64 and that of the link 66, when the lip member 14 is in pendent position, is even greater than the corresponding angle in the embodiment of FIGURES 1 and 2. Naturally, operation of the dockboard unit shown in FIGURES 3 and 4 is identical with operation of the dockboard unit of FIGURES 1 and 2.

In short, it will be seen that the subject invention provides a dockboard unit possessing the most favorable aspects of both a fixed type lip and a movable type lip. Contact between the lower surface 34 of the lip member and a truck, and further relative movement therebetween, will cause the lip member 14 to swing or pivot from its normal position to its fully operative position, as illustrated in dotted lines in FIGURE 3. As aforementioned, in such fully operative or extended position, the size of the angle $x$ is reduced to substantially zero. On the other hand, contact between the upper surface 30 of the lip member and a truck, and further relative movement therebetween, will cause the lip member 14 to swing downwardly and to move toward its pendent position, as shown in FIGURES 2 and 4. Thus, the truck will not then bend, break or otherwise damage or mutilate the lip member of the present invention, even if such truck inadvertently backs into the same. Instead, at worst, the lip member will merely be moved from its normal biased position to a depressed and partially or fully pendent position. If, thereafter, the main platform 12 is merely raised by the actuating mechanism, the result will be that the lip member 14 will again resiliently swing forwardly to its normal position of FIGURES 1 and 3.

Figure 6:
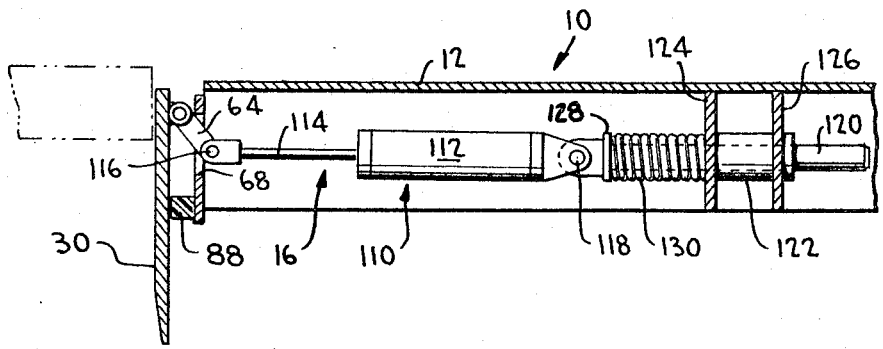
FIGURE 6 is a sectional view, similar to FIGURE 5, but with the lip member being in pendent position; and, FIGURE 7 is a sectional view, similar to FIGURE 5, with the actuating cylinder used to lower the lip member to pendent position.
Figure 7:
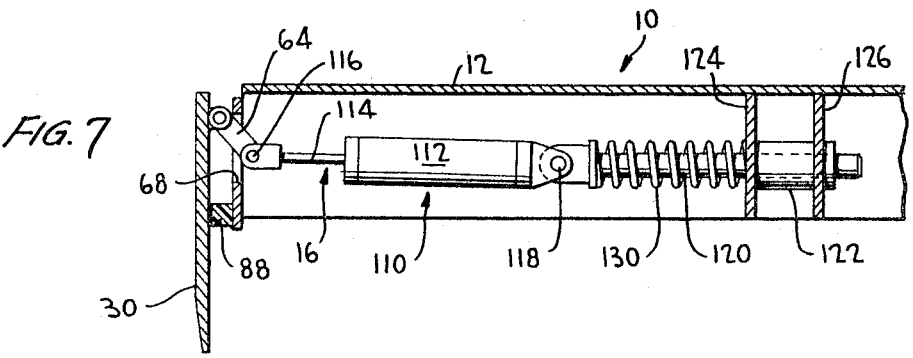

Considering now the further modified embodiment of FIGURES 5, 6 and 7, the lip member 30 and the leg means 64 are identical with that shown in FIGURES 3 and 4. However, the linkage means 16 includes an especial lip actuating mechanism in the form of a fluid operated extensible mechanism generally designated 110. Specifically, the mechanism 110 includes a cylinder and piston assembly 112 which can be hydraulically or pneumatically operated. The mechanism 110 also includes an extensible piston rod 114 which moves responsively to movement of the piston within the cylinder. The piston rod 114 is pivotally connected with the leg means 64 by a pivot pin 66 so that actuation of the mechanism 110 extends the rod 114 and hence raises the lip member 30 to its normal position.

The cylinder and piston assembly 112 is connected by a pivot pin 118 to the forward end of an elongated rod 120. The rod 120 is slidably mounted within a sleeve 122 supported by a pair of spaced walls 124 and 126 extending between the side beams of the main platform 12. The rod 120 carries a flange or shoulder 128 near its forward end and biasing means in the form of a compression spring 130 which surrounds the rod 120 and reacts between the shoulder 128 and the wall 124. The force of the biasing spring 130 pushes the cylinder and piston assembly 112 away from the wall 124 and thus tends to raise the lip member 30.

When the fluid operated extensible mechanism 110 is actuated or energized, as it usually is, the piston rod 114 is in its extended position and in combination with the biasing force of the spring 130, it tends to move the lip member 30 to its normal position, as shown in FIGURE 5. In the event that a truck with too high a bed should inadvertently back into the lip member 30, the lip member will be folded downward toward its pendent position against the action of the biasing spring 130. That is, the rod 120 slides through the sleeve 122, thereby moving the shoulder 128 toward the wall 124 and serving the spring 130 to be compressed. The spring 130 is substantially fully compressed when the lip member 30 reaches its fully pendent position of FIGURE 6. When the truck releases the lip member 30, it will again rise from its position of FIGURE 6 to its position of FIGURE 5.

Of course, using the embodiment of FIGURES 5–7, it is possible to lower the lip member 30, whenever desired. That is, deactuation of the cylinder and piston assembly 112 causes the piston rod 114 to retract and the lip member 30 to lower, as shown in FIGURE 7. However, it will be seen that the biasing means 130 is not compressed in FIGURE 7. Hence, as soon as the cylinder and piston assembly 112 is energized, the piston rod 114 will be extended and the lip member 30 will be returned to the position of FIGURE 5.

After reading the foregoing detailed description, it should be apparent that the objects set forth at the outset of the specification have been successfully achieved by the present invention. Accordingly,

What is claimed is:

1. A dockboard comprising a main platform having a forward end, a rear end and a substantially planar top surface extending therebetween, a lip member having opposed upper and lower surfaces, means pivotally connecting said lip member with said main platform at said forward end, said lip member being movable to a first position, defining an elevated position, whereat the upper surface of said lip member is substantially coplanar with said top surface, thereby forming a forward extension of said main ramp, said lip member also being movable to a second position, defining a pendent position, whereat the upper surface of said lip member is substantially perpendicular with said top surface, linkage means coupled between said lip member lower surface and said main platform, said linkage means including an operating crank having two cooperating arms movable about a fulcrum, and biasing means coacting with said linkage means to normally position said lip member, said normal position of said lip member being less than 45° displaced from the plane of said top surface, whereby engagement of a truck bed with said lip member upper surface will move said lip member toward said second position and engagement of a truck bed with said lip member lower surface will move said lip member toward said first position, said operating crank being operatively connected with said biasing means whereby said biasing means urges said crank to a normal position when said lip member is in its normal position, and whereby movement of said lip member from its normal position causes a corresponding movement of said operating crank from its normal position.

2. A dockboard as defined in claim 1 wherein said means pivotally connecting said lip member with said main platform is a hinge means having a hinge axis parallel to the plane of said top surface and extending transversely of said dockboard.

3. A dockboard as defined in claim 2 wherein said linkage means includes leg means fixed to said lip member lower surface and depending therefrom.

4. A dockboard as defined in claim 3 wherein said leg means is fixed to said lip member forwardly of said hinge means.

5. A dockboard as defined in claim 3 wherein at least a portion of said leg means intersects said hinge means whereby said hinge axis extends perpendicularly therethrough.

6. A dockboard as defined in claim 1 further including a manually engageable means connected with said operating crank to enable said operating crank to be moved from its normal position to thereby responsively move said lip member from its normal position toward said second position.

7. A dockboard as defined in claim 6 further including selectively operable lock means operative to maintain said operating crank out of its normal position, against the force of said biasing means, to thereby selectively lock said lip member in its second position.

8. A dockboard comprising a main platform having a forward end, a rear end and a substantially planar top surface extending therebetween, a lip member having opposed upper and lower surfaces, means pivotally connecting said lip member with said main platform at said forward end, said lip member being movable to a first position, defining an elevated position, whereat the upper surface of said lip member is substantially coplanar with said top surface, thereby forming a forward extension of said main ramp, said lip member also being movable to a second position, defining a pendent position, whereat the upper surface of said lip member is substantially perpendicular with said top surface, linkage means coupled between said lip member lower surface and said main platform, and biasing means coacting with said linkage means to normally position said lip member between said first and second positions, said linkage means including an operating crank swingable about a fulcrum, a link connected at one end with said operating crank, a lever having first and second ends, said lever first end being pivotally connected with the other end of said link, said lever second end being coupled with said biasing means, leg means depending from said lip member and a further link member connected between said leg means and said lever, whereby engagement of a truck bed with said lip member upper surface will move said lip member toward said second position and engagement of a truck bed with said lip member lower surface will move said lip member toward said first position.

9. A dockboard comprising a main platform having a forward end, a rear end and a substantially planar top surface extending therebetween, a lip member having opposed upper and lower surfaces, means pivotally connecting said lip member with said main platform at said forward end, said lip member being movable to a first position, defining an elevated position, whereat the upper surface of said lip member is substantially coplanar with said top surface, thereby forming a forward extension of said main ramp, said lip member also being movable to a second position, defining a pendent position, whereat the upper surface of said lip member is substantially perpendicular with said top surface, linkage means coupled between said lip member lower surface and said main platform, and biasing means coacting with said linkage means to normally position said lip member between said first and second positions, said linkage means including a fluid operated extensible mechanism which, when actuated, moves said lip member to said normal position between said first and second positions, said fluid operated extensible mechanism including a cylinder and piston assembly having a piston rod pivotally connected with said lip member, said linkage means further including an elongated rod pivotally connected with said cylinder and piston assembly and means slidably supporting said elongated rod to said main platform, said elongated rod including a shoulder means, said biasing means surrounding said elongated rod and reacting between said shoulder means and said means slidably supporting said elongated rod to said main platform, whereby engagement of a truck bed with said lip member upper surface will move said lip member toward said second position and engagement of a truck bed with said lip member lower surface will move said lip member toward said first position.

References Cited

UNITED STATES PATENTS

| | | | |
|---|---|---|---|
| 2,714,735 | 8/1955 | Watson | 14—71 |
| 3,201,813 | 8/1965 | Le Clear | 14—71 |
| 3,203,002 | 8/1965 | McGuire | 14—71 |
| 3,255,478 | 6/1966 | Lambert | 14—71 |
| 3,271,801 | 9/1966 | Dieter et al. | 14—71 |
| 3,316,575 | 5/1967 | Larsen et al. | 14—71 |

JACOB L. NACKENOFF, *Primary Examiner.*